US 7,036,038 B2

(12) United States Patent
Urzí et al.

(10) Patent No.: US 7,036,038 B2
(45) Date of Patent: Apr. 25, 2006

(54) CONVERTER CIRCUIT FOR SYNCHRONIZING BUS CONTROL SIGNALS ACCORDING TO A RATIO OF CLOCK FREQUENCIES BETWEEN DIFFERENT CLOCK DOMAINS

(75) Inventors: Ignazio Urzí, Catania (IT);
Massimiliano Fieni, Paternò (IT);
Salvatore Pisasale, Catania (IT)

(73) Assignee: STMicroelectronics, S.r.l., Agrate Brianza (IT)

( * ) Notice: Subject to any disclaimer, the term of this patent is extended or adjusted under 35 U.S.C. 154(b) by 504 days.

(21) Appl. No.: 10/393,383

(22) Filed: Mar. 20, 2003

(65) Prior Publication Data

US 2003/0198287 A1 Oct. 23, 2003

(30) Foreign Application Priority Data

Mar. 22, 2002 (EP) .................................. 02425182

(51) Int. Cl.
*H04L 7/00* (2006.01)
*G06F 1/12* (2006.01)
(52) U.S. Cl. ...................................... 713/401; 713/501
(58) Field of Classification Search ................ 713/501, 713/400, 401
See application file for complete search history.

(56) References Cited

U.S. PATENT DOCUMENTS

| 5,602,878 | A | * | 2/1997 | Cross ........................... 375/354 |
| 5,771,372 | A | * | 6/1998 | Pham et al. ................. 713/400 |
| 6,000,037 | A |   | 12/1999 | Herbert ...................... 713/400 |
| 6,081,904 | A |   | 6/2000 | Chencinski et al. ......... 713/400 |
| 6,172,540 | B1 |   | 1/2001 | Gandhi ....................... 327/145 |
| 6,275,077 | B1 | * | 8/2001 | Tobin et al. ................. 327/108 |
| 6,516,420 | B1 | * | 2/2003 | Audityan et al. ........... 713/400 |
| 6,636,980 | B1 | * | 10/2003 | Gervais et al. .............. 713/600 |

* cited by examiner

*Primary Examiner*—Lynne H. Browne
*Assistant Examiner*—Eric Chang
(74) *Attorney, Agent, or Firm*—Lisa K. Jorgenson; Allen, Dyer, Doppelt, Milbrath & Gilchrist, P.A.

(57) ABSTRACT

A converter circuit for performing transfer of control logic signals between a first device and a second device in connection with an interconnection bus, the first device operating at the frequency of a first clock signal and the second device operating at the frequency of a second clock signal. The clock frequencies may be in a first ratio to one another corresponding to unity, as well as in a second and a third ratio. The converter circuit includes manipulation circuit elements which define respective propagation paths through the converter circuit for control signals. A logic network may assume three states, corresponding, respectively, to the first, second and third ratios between the frequencies of the clock signals, selectively interposing the manipulation elements in the propagation paths.

23 Claims, 5 Drawing Sheets

CLOCK_2 = CLOCK_1

CLOCK_2 = 1/2 CLOCK_1

CLOCK_2 = 2/3 CLOCK 1

CONVERTER CIRCUIT FOR SYNCHRONIZING BUS CONTROL SIGNALS ACCORDING TO A RATIO OF CLOCK FREQUENCIES BETWEEN DIFFERENT CLOCK DOMAINS

FIELD OF THE INVENTION

The present invention relates to frequency converters, and more particularly to frequency converters for interconnect bus Systems.

BACKGROUND OF THE INVENTION

Complex digital systems are normally made up of a certain number of devices (cores, peripheral memories, etc.), which exchange information. Frequently, such devices operate at different clock frequencies, with frequencies that may be defined as semi-synchronous, in the sense that they refer to clocks of different value but with certain given phase relations between them. For example, the interconnection system developed by the present Assignee under the commercial name STBus Interconnect can be used in conjunction with the CPU known as ST40, also produced by the present Assignee.

Such a CPU needs to be able to operate on the basis of different frequency ratios, namely in conditions in which the clock of the interconnection system has a ratio of 2/3, one half, or equal to the clock of the CPU. Under such conditions, there exists the need to have available a synchronization mechanism that is able to adequately synchronize the two clock domains (i.e. that of the CPU and that of the interconnection bus), at the same time reducing occupation of space on the chip and preventing latency phenomena from arising.

No currently known approach is able to provide a satisfactory synchronization. For example, the approach known as "asynchronous bridge" corresponds to a frequency converter of altogether general application. This approach, however, involves intrinsic drawbacks, linked, for instance, to the control circuitry (which is somewhat complex), to the occupation of space (which is, in turn, linked both to the complexity of the control logic and to the use of memory elements), as well as to latency phenomena (due to the use of stages that carry out a re-timing function).

Another known approach is the one known as "dual-port memory". This is simply a memory that implements a queue of a first-in first-out (FIFO) type, with the use of two distinct pointers, one for loading the data and the other for reading the data. However, also this approach presents intrinsic drawbacks linked to the use of memory elements and latency.

There are then known devices that are generically referred to as synchronizers, which include networks of specific flip-flops appropriately connected together. This approach entails a smaller occupation of area on the chip, but is not exempt from the drawback of latency associated to the presence of re-timing stages.

SUMMARY OF THE INVENTION

The present invention provides a frequency converter that is able to meet the requirement of ensuring synchronization between two clock domains, to overcome the difficulties and drawbacks outlined above.

According to the present invention, it is possible to achieve the a relatively high level of throughput without introducing undesired latency. The circuit is very simple and does not occupy an extensive area on the silicon. It has a reduced effect on the critical path-timing functions and may be used or re-used at any point of interaction between different clock domains.

In particular, the approach according to the invention includes, in the currently preferred embodiment, just two clock domains in phase with respect to one another, with the possibility of obtaining the frequency ratios 1/1, 1/2, 2/3. The maximum throughput possible is achieved (that of the slowest clock), with a minimal effect on the area of chip used. This prevents any latency from arising in the generation of all the control signals coming from a given clock domain prior to their being sent to the other clock domain.

BRIEF DESCRIPTION OF THE DRAWINGS

The present invention will now be described, purely by way of non-limiting example, with reference to the attached drawings, in which.

DETAILED DESCRIPTION OF THE PREFERRED EMBODIMENTS

Figure 1:
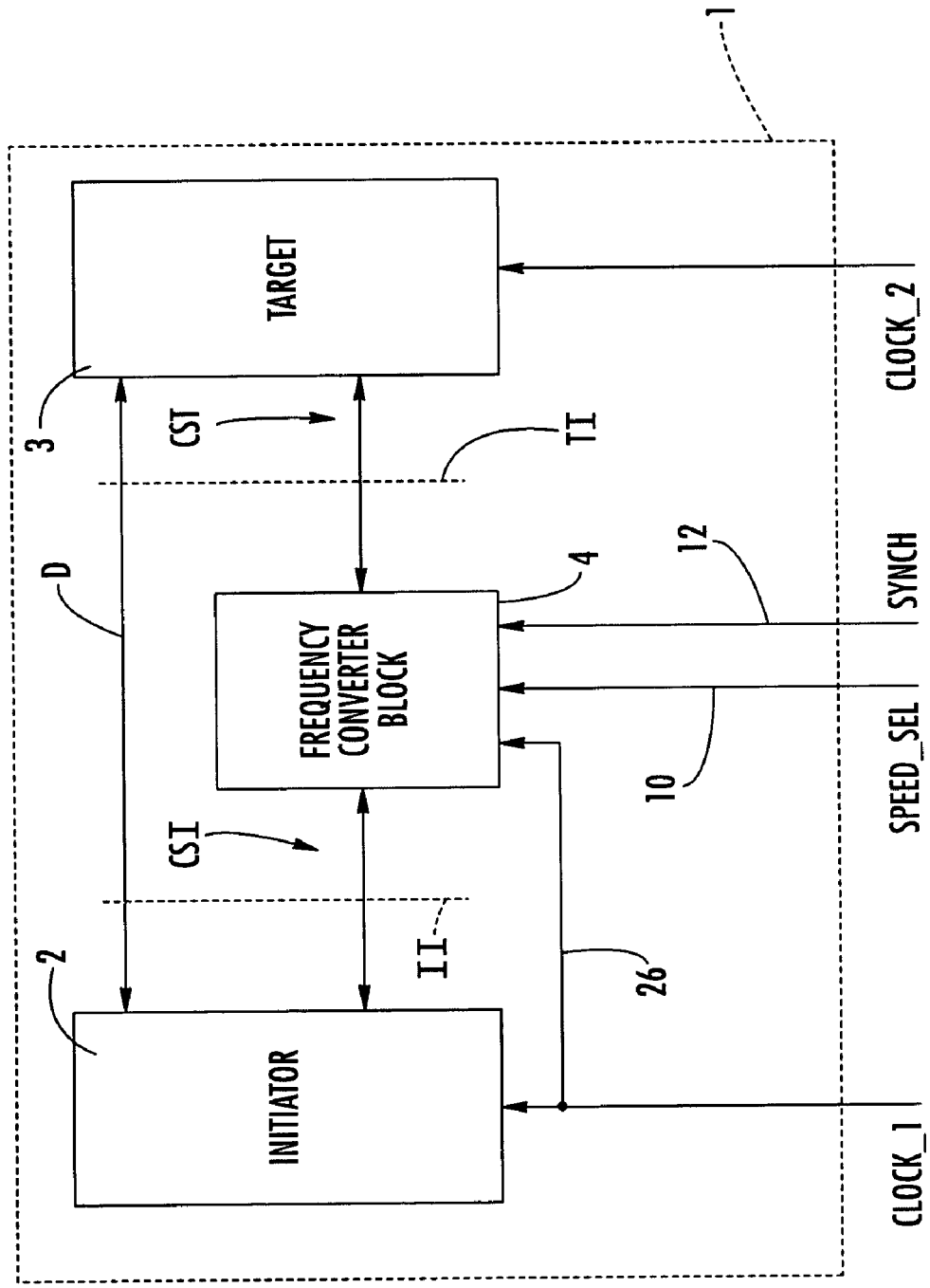
FIG. 1 is a general block diagram which illustrates the context of application of the approach according to the invention.

As a foreword to the following description of some examples of an embodiment of the invention, it may be useful, for reasons of clarity, to recall the definitions of some terms used in the following. As already mentioned in the introductory part of the present description, the approach according to the invention has been developed with particular regard to its possible use in the framework of the system developed by the present Assignee under the commercial name STBus. The STBus system is a set of protocols, interfaces, primitives, and architectures that specify an interconnection subsystem that is versatile in terms of performance features, architecture and implementation. Defined as STBus node is an interconnection system based on the STBus protocol, to which certain given ports are connected. An STBus node is made up of two main blocks: the control block and the datapath block. The first block performs the arbitration function (i.e., the process whereby it is decided which initiator can assume control of the system buses according to the priority of the initiator and the arbitration scheme implemented or selected), whereas the second block is the routing network, through which the data flow.

It should be recalled that, according to current terminology, an "initiator" is defined as any device that accesses the system resources through the bus. This occurs typically via a port of the initiator, which sends request packets and receives response packets. Defined, instead, as "target" is a resource of the system, to which the initiators gain access through the bus. Generally this occurs via a target port, which receives request packets and sends response packets. To connect two different nodes of the STBus system together, it is possible to use buffer elements or buffer modules, which include re-timing blocks that are able to function as targets for the first node and as initiators for the second node. When the need arises, a buffer can also be used as a generic re-timing stage.

As far as the conversion function proper is concerned, defined as "size converter" is a block that can act as adaptor between two environments (such as, for example, two STBus nodes) having different bus data dimensions. The type converter is instead a block that can act as an adaptor between two blocks that follow two different types of STBus protocol, such as an initiator and a node, or else a node and a target. The protocol converter is, instead, a block that can act as an adaptor between two blocks that follow different protocols, for example, the AMBA protocol and the STBus protocol. It should be recalled that a protocol is a set of rules that the initiators and targets must follow during a transaction, the rules being expressed in terms of signal management—assertion and de-assertion—during a transaction, identified essentially by a request packet and by the respective response packet.

A "packet", in the present context, is a set of cells, where the cell identifies the database quantity that can be transferred onto the bus during a single clock cycle. The dimensions of the cell identify the size of the data bus. The last cell of the packet is characterized in that the end-of-packet (EOP) signal assumes a given logic level, such as a high logic level. Finally, a "message" is a set of packets with the last packet characterized by a corresponding logic level, for example, the fact that a signal called "not-end-of-message", is at the low logic level. A "port" or "programming port" is the entity IP which enables access to the internal registers of the bus to program the arbitration scheme of the programmable arbitrator elements. In this context, a "frequency converter" is therefore a block that is able to act as an adaptor between two blocks that operate at different clock frequencies.

Hence, in the block diagram of FIG. 1, the reference number 1 designates as a whole the context of the bus (such as, for example, the STBus) in which the subsequent transactions are carried out between devices functioning as initiators and targets. As is well-known to persons skilled in the art, the same element can function perfectly well at different instants, both as an initiator and as a target in the framework of the bus.

The diagram represented in FIG. 1 refers to an element functioning as an initiator, and designated by 2; this consists, for instance, of a CPU, such as a CPU ST40, timed by a first clock signal (cpu_clock) designated as clock_1. The diagram of FIG. 1 then illustrates an element functioning as a target, this being designated by 3 and including, in the example illustrated (which, it is emphasized, is purely an example), of an STBus Interconnect system timed by a second clock signal (Interconnect_clock) designated as clock_2. It is likewise assumed that, between the two elements 2 and 3, a transaction is performed that corresponds to the exchange of data, designated as a whole by D.

To be able to carry out the transaction properly (assuming that, in general, the frequencies of the two signals clock_1 and clock_2 can be different from one another), it is necessary to perform a frequency-conversion function between the two clocks in question. The above is achieved via a block functioning as frequency converter and designated as a whole by 4. To operate in this way, the block 4 receives (in general, from the outside world) information regarding the following entities:

the frequency of one of the clocks in question: in the example illustrated, the signal clock_1 is assumed;
the ratio existing between the frequencies of the two signals clock_1 and clock_2 (information supplied to the converter 4 through the signal speed_sel); and
a general synchronization signal designated as synch.

The aforesaid signals are generated and supplied according to criteria in themselves known, which do not call for any description herein, also because they are not important for the purposes of understanding the present invention.

Specifically, the information regarding the frequency ratio is vehicled by the signal speed_sel on the basis of the following table:

| speed_sel (1) | speed_sel (0) | clock_2 |
|---|---|---|
| 0 | 0 | clock_1 |
| 1 | 0 | ⅔ clock_1 |
| 0 | 1 | ⅓ clock_1 |
| 1 | 1 | NOT ALLOWED |

The signal synch carries, instead, the information regarding the phase relation between the two clock signals.

In fact, even though the two clock signals are mutually in phase, they may have a frequency ratio different from 1 (clock_1=clock_2). This means, for example, that according to the faster clock (for example, clock_1) the second clock (clock_2) can present—according to the relation existing between the frequencies of the two clocks—rising edges that coincide with the rising edges of the faster clock. In this case, it is necessary to know the clock period (referred, in general, to the faster clock, here assumed as being clock_1), in which the rising edges coincide.

The information is carried precisely by the synch signal, which is set at "1" when the rising edges of the two clocks coincide and remains at level "1" only for one clock cycle referred to the faster clock, on the basis of the diagrams represented in FIGS. 2 and 4, to which we shall return later. In this connection, it will be noted that what has been said with reference to the rising edges is given purely by way of example and corresponds to a preferred embodiment of the present invention. The same ideas set forth herein likewise apply in an identical way also to the falling edges.

Figure 2:
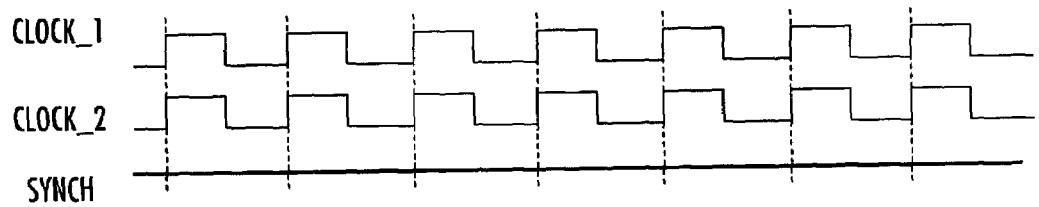
FIGS. 2 to 8 show various timing diagrams which illustrate the approach according to the invention.

The situation represented in FIG. 2 corresponds to the situation in which the two signals clock_1 and clock_2, in addition to presenting the same frequency, are also exactly in phase with one another. In this case, the two signals in question are identical to each other (in practice, they are the same signal), and the synch signal is, in practice, meaningless. Since the two clock signals form exactly the same signal, the signals generated starting from one of the clock signals can be sampled through the other clock signal, without this giving rise to any problems. In this case, the synch signal remains constantly at level "0".

Figure 3:
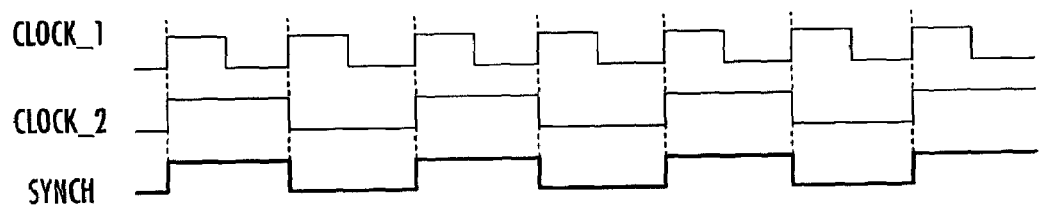

FIG. 3 represents, instead, a situation in which the second signal clock_2 presents a frequency exactly equal to one half of the frequency of the signal clock_1. In this case, the synch signal is at level "1" for a period of the signal clock_1 and at level "0" for the subsequent period of the same signal clock_1. In practice, in this case the synch signal has the same pattern as the signal clock_2.

Figure 4:
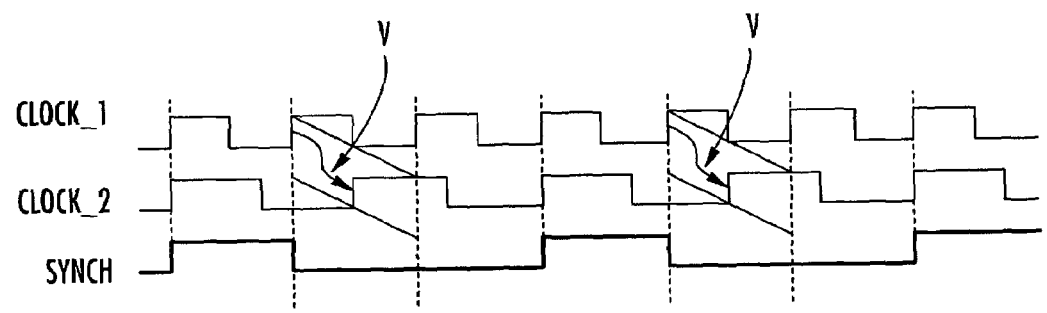

The example in FIG. 4 refers, instead, to the situation in which the signal clock_2 has a frequency equal to 2/3 of the frequency of the signal clock_1. In this case, the synch signal remains at level "1" for a period of the signal clock_1 and then passes to "0" in the next two periods. In other words, in the situation represented in FIG. 4, the synch signal is at the logic level "1" for one period out of three of the signal clock_1. This situation proves critical in that, as presented in FIG. 4, there may occur violations of the set-up time in the case of data generated on the rising edge of the signal clock_1 and latched in the target block with the rising edge of the signal clock_2 that immediately follows.

There now follows a description of the interventions that block 4 of FIG. 1 must make, via the initiator interface II and the target interface TI so as to send corresponding control signals CSI and CST to the initiator 2 and to the target 3. In the case represented in FIG. 2, i.e., when the two signals clock_1 and clock_2 have the same frequency, the conversion block 4 does not need to carry out any intervention of manipulation on the control signals in question in these conditions; i.e., the converter 4 proves to be in effect "transparent" to the signals.

In what follows, the conditions of FIGS. 3 and 4 are considered, i.e., the conditions in which the two clock signals have different frequencies. For reasons of simplicity of treatment, we shall first deal with the case in which the frequency of the signal clock_2 is equal to 2/3 of the frequency of the signal clock_1, it being understood that all the signals in which the suffix "_1" appears refer to the signal clock_1 (which will be assumed as being the faster), while the signals with suffix "_2" refer to the signal clock_2.

Figure 5:
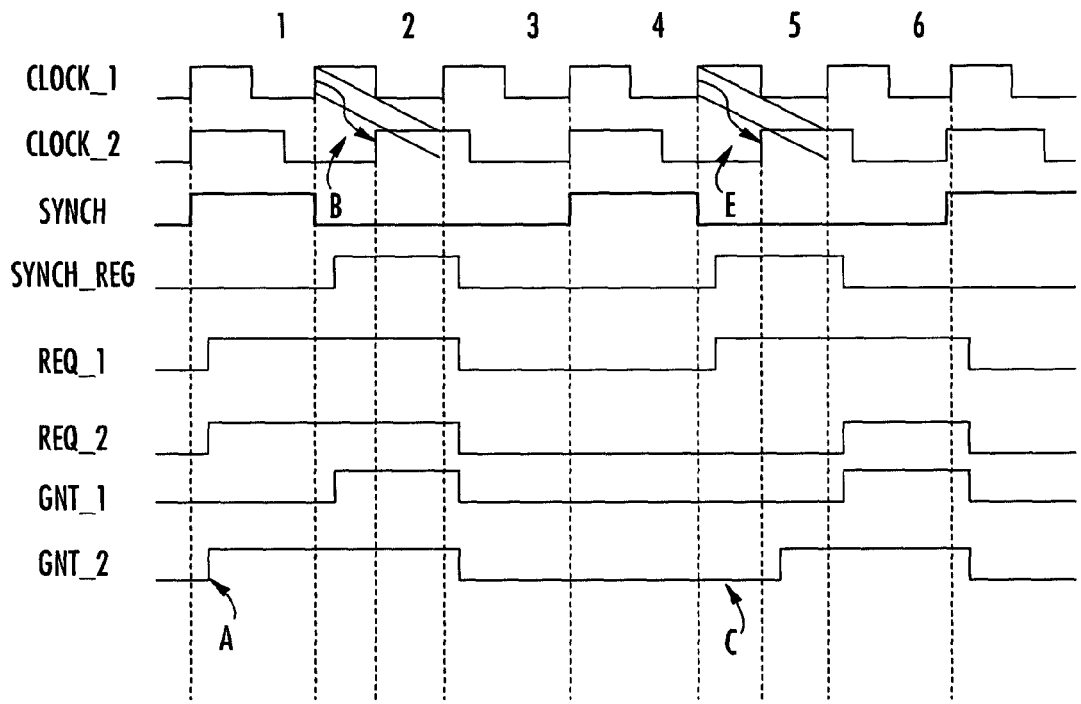

This situation is represented in detail in FIG. 5, which refers to a transaction forwarded by the initiator 2, which sends to the target 3 a request signal req_1, assumed to be active when it is high. Specifically, FIG. 5 illustrates the control signals exchanged between the two blocks on the direct communication path. The hypothesis is that the target 3 is always ready to receive any action whatsoever activated by the initiator block 2, this being indicated by the transition of the signal gnt_2 to the logic level "1". If the signal req_1 is generated at instant A (period 1), the frequency converter 4 transfers this request to the target 3 (signal req_2 high, hence active), without any manipulation.

Availability of the target block 3 (given by the signal gnt_2, which is active and hence at a high level) is masked by the frequency converter for one clock cycle of the signal clock_1 (period 1), before it is sent to the initiator block (gnt_1). This is due to the fact that the initiator block 2 considers the action activated previously to be completed at the start of period 2 (rising edge of clock_1), all the information being removed from the bus, and the target block 3 being set in conditions of not receiving the action (in fact, the target block 3 takes into consideration the action activated by the initiator block 2 only at point B).

Thus, to guarantee a correct exchange of information, the signal gnt_1 is supplied to the initiator block 2 in period 2 of the signal clock_1, just as is illustrated in FIG. 5. If the signal req_1 is generated at the starting point C, the frequency converter blocks it for one cycle of clock_1 before sending it to the target block 3. In this case, the signal req_1 is sent to the target block 3 in period 6, this being due to the fact that the target block 3 takes the signal req_1 into account at the rising edge of the signal clock_2, i.e., at point E. The distance between the rising edges of the two clock signals is, in this case, critical in so far as there may occur a violation of the set-up time in target block 3.

To obtain a quantitative idea, the distance between the rising edges of the two clocks can be evaluated, in this particular case, with reference to a case in which the signal clock_1 has a frequency of 166 MHz (corresponding to a period of approximately 6 nanoseconds) and the signal clock_2 has a frequency of 110 MHz (corresponding to a period of approximately 9 nanoseconds). In this case, the value of the difference is equal to 3 nanoseconds. Regarding the signal gnt_1, this is treated as described in the previous case.

Figure 6:
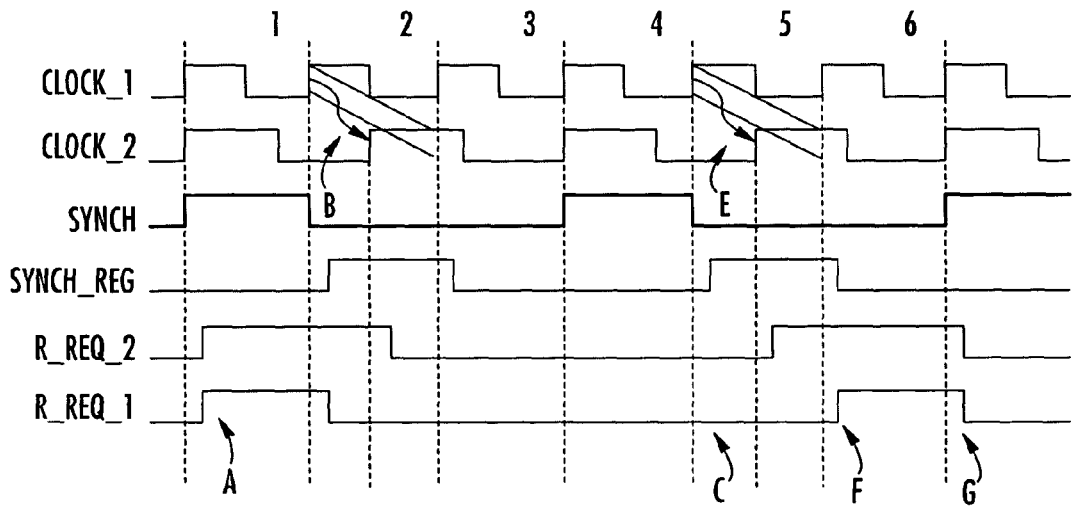

The diagram of FIG. 6 refers to the control signals exchanged between the two blocks on the response path. In this case, the target block 3 responds to an action activated by the initiator block 2 (signal req_2 active, since it is high) at the starting instant A. This response is sent directly to the initiator block 2 (r_req_1) without any action of translation whatsoever (i.e., it is simply appropriately cut). The initiator block 2 takes this response into account at the rising edge of the signal clock_1, correlated to the start of period 2. The target block 3 de-activates the signal r_req_2 at point B. If the signal r_req_2 is generated at the starting point E (see again FIG. 6), it cannot be supplied directly to the initiator block 2 (r_req_1), since the initiator block 2 would seek to sample this response signal at point F (according to its clock frequency), clearly violating the set-up time, as already described with reference to FIG. 5. Thus the signal r_req_2 is masked for one half of a cycle of the signal clock_1, so making it available to the initiator block 2 at instant G (period 6).

Figure 7:
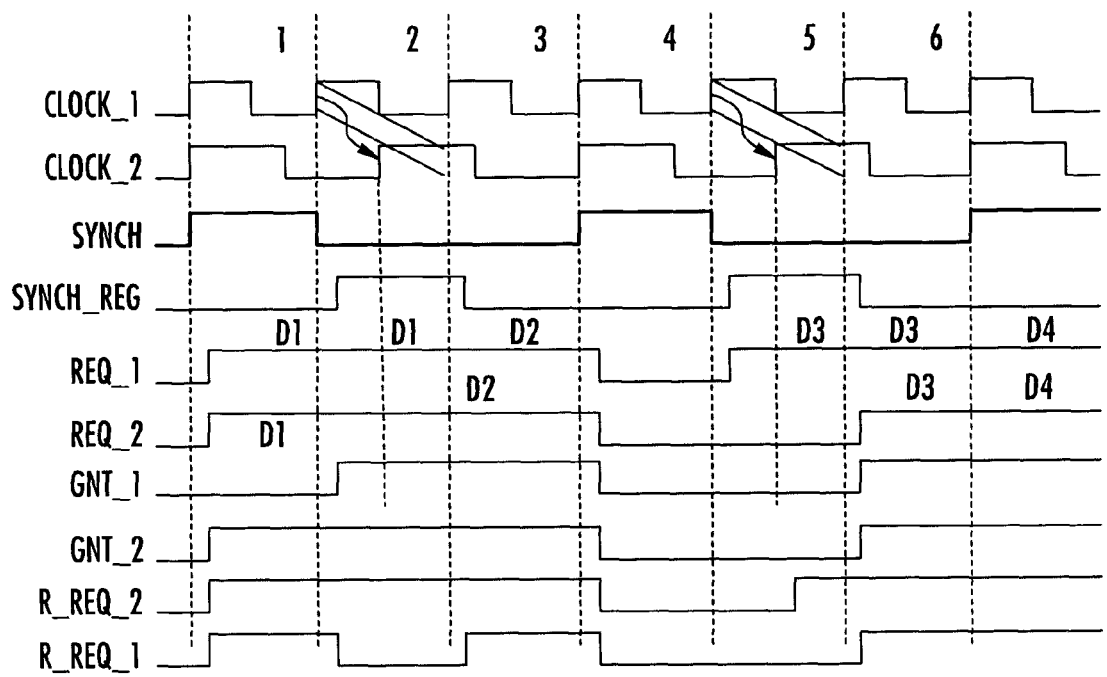
Figure 8:
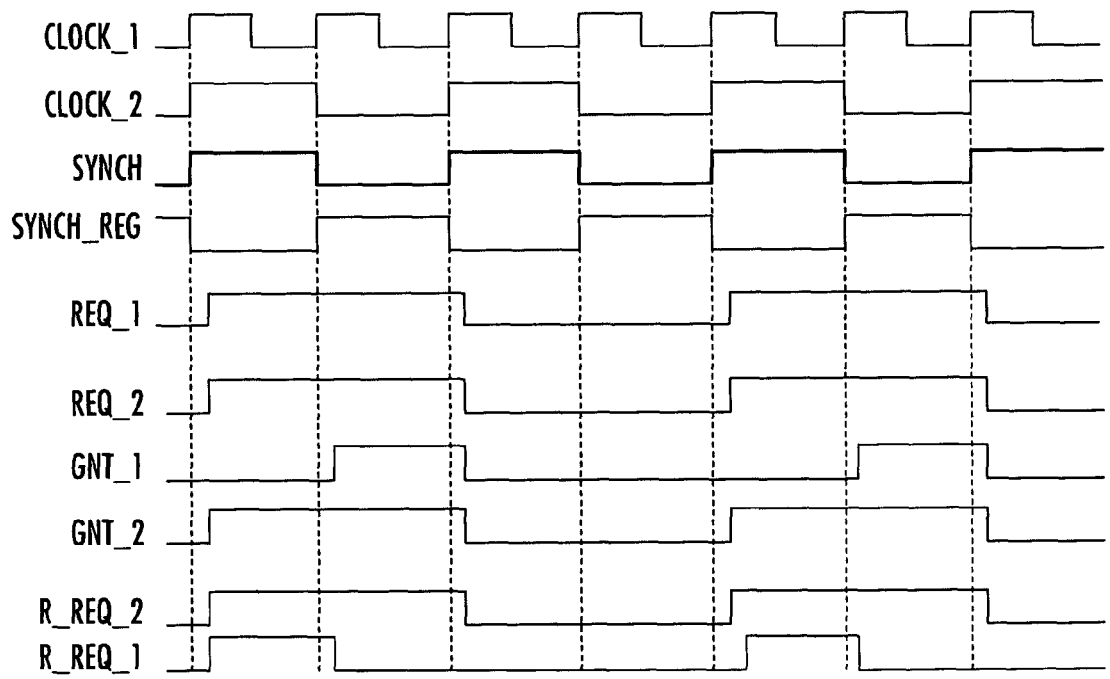

The same considerations apply with reference to the situations represented in FIGS. 7 and 8. In the specific case, FIG. 7 refers to a situation in which the frequency of the signal clock_2 is equal to 2/3 of the frequency of the signal clock_1, with consecutive accesses. FIG. 7 represents the control signals exchanged between the two blocks 2 and 3 on the direct path and on the response path. In this case, the same considerations made with reference to FIG. 6 also apply here, taking into account the behavior of the frequency converter 4 for preventing the critical period (i.e., the one in which there may be a violation of the set-up time). It is important to note that, in all these cases, it is the frequency converter 4 that guarantees operation of the system at the maximum possible frequency (frequency of clock_2) without any latency.

FIG. 8 refers, instead, to the control signals exchanged between the two blocks 2 and 3 on the direct path and on the response path in the case where the frequency of the signal clock_2 is equal to one half of the frequency of the signal clock_1, with a single access. This case is simpler as compared to the cases in which the ratio between the clock frequencies is equal to 2/3. Using the information of the synch signal, the transaction grant signal and the r_req signal coming from the target block 2 are appropriately cut in such a way as to prevent them from being sampled twice by the initiator 2. Also in this case, the frequency converter 4 guarantees operation of the system at the maximum frequency possible (the frequency of the signal clock_2), without any latency.

Figure 9:
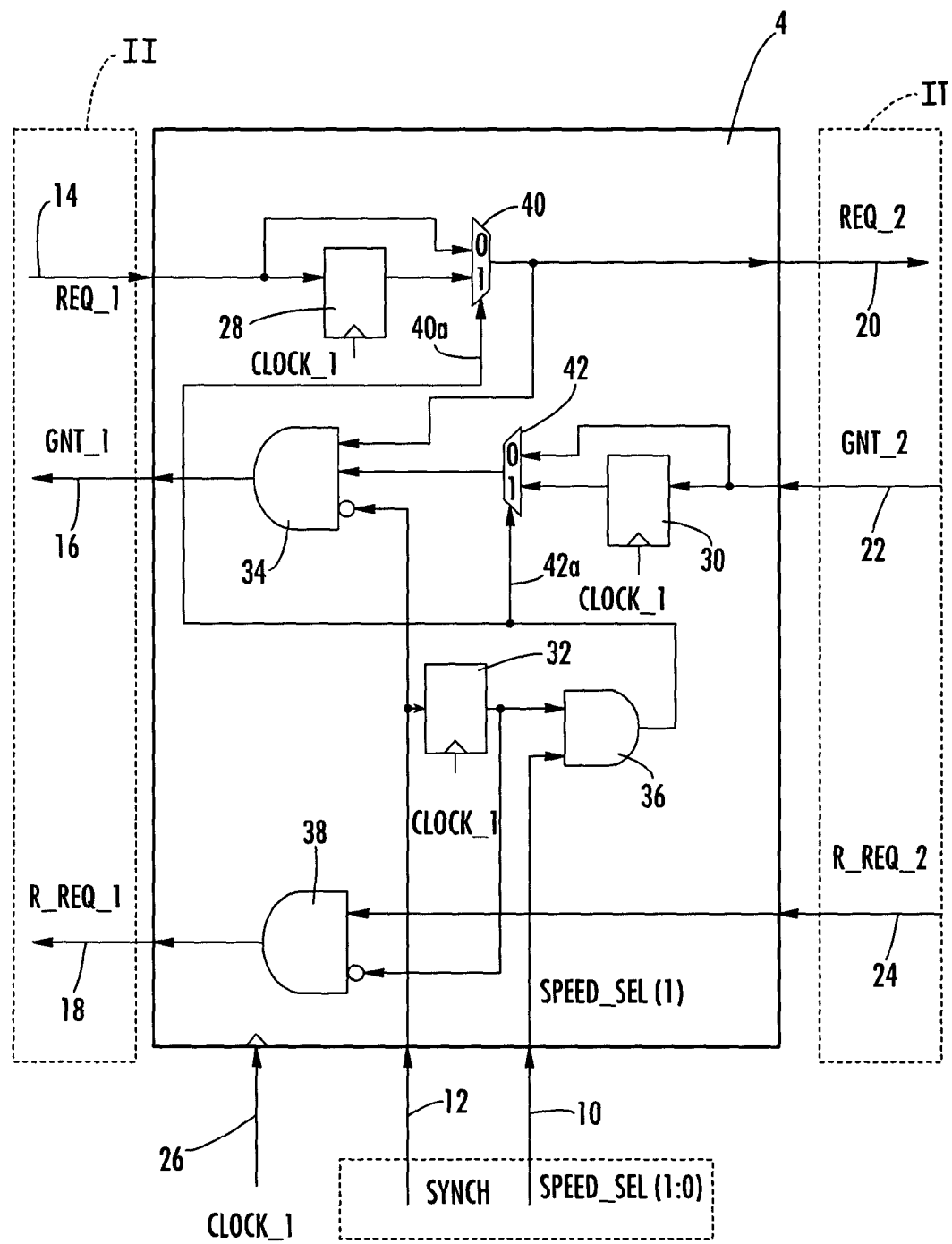
FIG. 9 is a block diagram of an embodiment of a frequency converter according to the invention.

The block diagram of FIG. 9 illustrates the internal structure of the frequency converter 4. In the diagram in question, the reference numbers 10 and 12 designate the lines on which the signal speed_sel and the signal synch reach the converter 4. The reference numbers 14 to 24 indicate, instead, in order, the lines on which the following signals reach the converter 4 or else are emitted by the converter 4:

req_1, coming from the initiator 2;
gnt_1, sent to the initiator 2;
r_req_1, sent to the initiator 2;
req_2, sent to the target 3;
gnt_2, coming from the target 3; and
r_req_2, also coming from the target 3.

The lines 14, 16 and 18 belong to the domain of the signal clock_1, which functions as master, while the lines 20, 22 and 24 belong to the domain of the signal clock_2, which acts as slave.

Timing of the converter 4 is ensured by a timing input 26 on which the signal clock_1 is supplied (this having the higher frequency) designed to be distributed to three flip-flops designated by 28, 30 and 32. The reference numbers 34, 36 and 38 designate, instead, three AND gates, whereas the symbol "o" represents the operation of logic complementation. Finally, the reference numbers 40 and 42 designate two mux components associated to the flip-flops 28 and 30, which transfer one or other of the signals brought to their input to their output according to the logic level of the signal present on the respective control lines 40a and 42a.

In practice, when the lines 40a and 42a are at the logic level "0", the flip-flops are by-passed, being excluded from the circuit. When the ratio between the frequencies of the signals clock_1 and clock_2 is equal to 1 (i.e., the synch signal set to "0"), the converter circuit 4 is practically transparent to the signals that traverse it, in the sense that the signal req_1 is copied into the signal req_2, the signal gnt_2 is copied into the signal gnt_1, and the signal r_req_2 is copied into the signal r_req_1.

In the case where the frequency of the signal clock_2 is equal to one half of the frequency of the signal clock_1, the synch signal practically copies the pattern of the signal clock_2, and the signal req_2 is, in effect, copied into the signal req_2 in so far as the signal present on line 42a is kept at the logic level "0". The converter 4 intervenes, instead, on the signal gnt_2, causing the signal to be shifted, so to speak, on the rising edge into the signal gnt_1 downstream of the coinciding rising edges and falling edges of the signals clock_1 and clock_2. The same function is performed, this time in the case of the falling edge, in relation to the signal r_req_2 when this is transferred as r_req_1 to the initiator module 2.

In the case, instead, where the frequency of the signal clock_2 is equal to 2/3 of the frequency of the signal clock_1, the circuit of FIG. 9 provides, in the single access case and in the consecutive access case respectively, the timing charts represented in FIGS. 5 to 7, namely:

- by masking the signal of availability of the target block 3 for one cycle of the signal clock_1 (see the delay imposed on the rising edge of the signal gnt_1 with respect to the rising edge of the signal gnt_2);
- by masking, in a similar way, the signal req_1, blocking it for one cycle of the signal clock_1 if this is generated at point C; and
- by cutting the signal r_req_2 or by masking it for one half of the cycle of the signal clock_1, if this is generated at point F, prior to forwarding it to the initiator block 2 as r_req_1.

From the block diagram illustrated in FIG. 9, it will be noted that the aforesaid cutting/delaying functions of one cycle of the signal clock_1 are ensured by the flip-flops 28, 30 and 32, while the logic gates 34, 36 and 38, as well as the mux elements 40 and 42, perform the dual function of:

- configuration of the converter 4 for the different operating states described (ratio between the frequencies of the signals clock_2 and clock_1 equal to 1, 2/3 and 1/2); and
- entry/de-entry of the manipulation elements represented by the flip-flops 28, 30 and 32 into/from the path of the various signals that traverse the converter 4.

Generally, the approach according to the invention is implemented in a converter circuit for performing transfer of control signals between a first device 2 and a second device coming under an interconnection bus, this being in conditions whereby the first device operates according to a first clock signal clock_1 at a first frequency and the second device operates according to a second clock signal clock_2 at a second frequency. These clock frequencies may be in a first ratio to one another corresponding to unity, as well as in a second and a third ratio, usually corresponding to 2/3 and 1/2, respectively.

The control signals comprise:

- an access-request signal req_1, req_2 to be transferred from the first device to the second device;
- a grant signal gnt_1, gnt_2 to be transferred from the second device to the first device; and
- a response-to-request signal r_req_1, r_req_2 to be transferred from the second device to the first device.

The converter circuit comprises:

- manipulation circuit elements (i.e., the flip-flops 28, 30 and 32) which identify respective propagation paths through the converter circuit for the access-request signal req_1, req_2, the grant signal gnt_1, gnt_1, and the response-to-request signal r_req_1, r_req_2; and
- a logic network (including, in the example illustrated, of the elements 34 to 42), which can assume three states, corresponding, respectively, to the aforesaid first, second and third ratios between the frequencies of the clock signals clock_1 and clock_2, interposing selectively manipulation elements in the aforesaid propagation paths.

When the logic network is in the first state corresponding to the ratio of unity between the frequencies, the manipulation elements are uncommitted by the propagation paths, so that the access-request signal req_1, req_2, the grant signal gnt_1, gnt_2, and the response-to-request signal r_req_1, r_req_2 propagate through the converter circuit 4 in the substantial absence of manipulation.

When the logic network comes to be in the second state corresponding to the second ratio between the frequencies, the manipulation elements are interposed in the aforesaid propagation paths, in such a way that:

- the request signal req_1, req_2 is selectively delayed in the transfer through the converter circuit 4 according to the logic levels assumed by the first clock signal and by the second clock signal at the instant of the request A, C;
- the grant signal gnt_1, gnt_2 is delayed in traversing the converter circuit 4 according to the logic levels assumed by the first clock signal and by the second clock signal at the instant of grant signalling A, C, D1, D3; and
- the response-to-request signal r_req_1, r_req_2 is delayed in traversing the converter circuit 4 according to the logic levels assumed by the first clock signal and by the second clock signal at the instant of response, so as to prevent a violation of the set-up time, the response-to-request signal r_req_1, r_req_2 being likewise shortened in time.

When the logic network comes to be in the aforesaid third state corresponding to the third ratio between the frequencies, the manipulation elements are uncommitted by the propagation path of the request signal req_1, req_2, so that the request signal propagates through the converter circuit 4 in substantial absence of manipulation. The aforesaid grant signal gnt_1, gnt_2 is, instead, subjected to delay in propagation through the converter circuit 4, while the response-to-request signal r_req_1, r_req_2 is shortened in time in traversing the converter circuit, to prevent double sampling by the first device. The arrangement is such that the converter operates at the maximum possible frequency in the absence of latency.

Of course, without prejudice to the principle of the invention, the details of construction and the embodiments may vary widely with respect to what is described and illustrated herein, without thereby departing from the scope of the present invention as defined in the attached claims.

That which is claimed:

1. A converter circuit for performing transfer of control signals between a first device and a second device in connection with an interconnection bus, the first device operating according to a first clock signal at a first frequency and the second device operating according to a second clock signal at a second frequency, the clock frequencies being in one of a first ratio to one another corresponding to unity, a second ratio and a third ratio, and in which the control signals include an access-request signal to be transferred from the first device to the second device, a grant signal to be transferred from the second device to the first device, and a response-to-request signal to be transferred from the second device to the first device, the converter circuit comprising:

manipulation circuit elements identifying respective propagation paths through the converter circuit for the access-request signal, the grant signal, and the response-to-request signal; and a logic network having three states, corresponding, respectively, to the first, second and third ratios between the frequencies of the clock signals, selectively interposing manipulation circuit elements in the propagation paths, so that a first state of the logic network corresponds to the first ratio, said manipulation elements being neutral in the propagation paths so that the access-request signal, the grant signal, and the response-to-request signal propagate through the converter circuit substantially without manipulation, a second state of the logic network corresponds to the second ratio, said manipulation elements controlling the propagation paths so that the request signal is selectively delayed in the converter circuit according to logic levels of the first clock signal and the second clock signal at an instant of receiving the request signal, the grant signal is delayed in the converter circuit according to logic levels of the first clock signal and the second clock signal at an instant of receiving the grant signal, and the response-to-request signal is delayed in the converter circuit according to the logic levels of the first clock signal and the second clock signal at an instant of receiving the response-to-request signal to prevent a setup time violation, and the response-to-request signal is shortened, and a third state of the logic network corresponds to the third ratio, said manipulation elements being neutral in the propagation path of the request signal so that the request signal propagates through the converter circuit substantially without manipulation, the grant signal being delayed in the converter circuit, and the response-to-request signal being shortened to prevent double sampling by the first device.

2. The circuit according to claim 1, wherein the second ratio corresponds to the frequency of the second clock signal being equal to 2/3 of the frequency of the first clock signal.

3. The circuit according to claim 1, wherein the third ratio corresponds to the frequency of the second clock signal being equal to one half of the frequency of the first clock signal.

4. The circuit according to claim 1, wherein said manipulation elements comprise delay elements for applying a delay equal to one cycle of the first clock signal.

5. The circuit according to claim 1, wherein said manipulation elements comprise flip-flops.

6. The circuit according to claim 5, wherein said flip-flops are timed with the frequency of the first clock signal.

7. The circuit according to claim 1, wherein said logic network comprises logic gates controlled by at least one of a first signal indicating the ratio between the frequency of the first clock signal and the frequency of the second clock signal, and a second signal indicating a phase relation between the first clock frequency and the second clock frequency.

8. The circuit according to claim 1, wherein said logic network comprises at least one multiplexor for controlling a respective manipulation element of the converter circuit.

9. A converter circuit for transferring control signals between a first device and a second device in connection with an interconnection bus, the first device operating according to a first clock signal at a first frequency and the second device operating according to a second clock signal at a second frequency, the clock frequencies being in one of a first ratio, a second ratio and a third ratio, the converter circuit comprising:

propagation paths for the control signals;

manipulation circuit elements identifying respective propagation paths through the converter circuit for the control signals; and a logic network having three states, corresponding, respectively, to the first, second and third ratios between the frequencies of the clock signals, selectively controlling manipulation circuit elements in the propagation paths, so that a first state of the logic network corresponds to the first ratio, said manipulation elements being neutral in the propagation paths so that the control signals propagate substantially unchanged through the converter circuit, a second state of the logic network corresponds to the second ratio, said manipulation elements controlling the propagation paths so that a first control signal is selectively delayed in the converter circuit based on the first clock signal and the second clock signal, a second control signal is delayed in the converter circuit based on the first clock signal and the second clock signal, and a third control signal is delayed in the converter circuit based on the first clock signal and the second clock signal to prevent a set-up time violation, and the third control signal is shortened, and a third state of the logic network corresponds to the third ratio, said manipulation elements being neutral in the propagation path of the first control signal so that the first control signal propagates substantially unchanged through the converter circuit, the second control signal being delayed in the converter circuit, and the third control signal being shortened to prevent double sampling by the first device.

10. The circuit according to claim 9, wherein the first ratio corresponds to the frequency of the second clock signal being equal to the frequency of the first clock signal, the second ratio corresponds to the frequency of the second clock signal being equal to 2/3 of the frequency of the first clock signal, and the third ratio corresponds to the frequency of the second clock signal being equal to one half of the frequency of the first clock signal.

11. The circuit according to claim 9, wherein said manipulation elements comprise delay elements for applying a delay equal to one cycle of the first clock signal.

12. The circuit according to claim 9, wherein said manipulation elements comprise flip-flops.

13. The circuit according to claim 12, wherein said flip-flops are timed with the frequency of the first clock signal.

14. The circuit according to claim 9, wherein said logic network comprises logic gates controlled by at least one of a first signal indicating the ratio between the frequency of the first clock signal and the frequency of the second clock signal, and a second signal indicating a phase relation between the first clock frequency and the second clock frequency.

15. The circuit according to claim 9, wherein said logic network comprises at least one multiplexor for controlling a respective manipulation element of the converter circuit.

16. A method for transferring control signals between a first device and a second device in connection with an interconnection bus, the first device operating according to a first clock signal at a first frequency and the second device operating according to a second clock signal at a second frequency, the clock frequencies being in one of a first ratio, a second ratio and a third ratio, the method comprising:
identifying respective propagation paths through a converter circuit for the control signals with manipulation circuit elements; and
selectively controlling the manipulation circuit elements in the propagation paths with a logic network having three states, corresponding, respectively, to the first, second and third ratios between the frequencies of the clock signals so that
a first state of the logic network corresponds to the first ratio, said manipulation elements being neutral in the propagation paths so that the control signals propagate substantially unchanged through the converter circuit,
a second state of the logic network corresponds to the second ratio, said manipulation elements controlling the propagation paths so that
a first control signal is selectively delayed in the converter circuit based on the first clock signal and the second clock signal,
a second control signal is delayed in the converter circuit based on the first clock signal and the second clock signal, and
a third control signal is delayed in the converter circuit based on the first clock signal and the second clock signal to prevent a set-up time violation, and the third control signal is shortened, and
a third state of the logic network corresponds to the third ratio, said manipulation elements being neutral in the propagation path of the first control signal so that the first control signal propagates substantially unchanged through the converter circuit, the second control signal being delayed in the converter circuit, and the third control signal being shortened to prevent double sampling by the first device.

17. The method according to claim 16, further comprising operating the converter circuit at a maximum potential frequency in an absence of latency.

18. The method according to claim 16, wherein the first ratio corresponds to the frequency of the second clock signal being equal to the frequency of the first clock signal, the second ratio corresponds to the frequency of the second clock signal being equal to $2/3$ of the frequency of the first clock signal, and the third ratio corresponds to the frequency of the second clock signal being equal to one half of the frequency of the first clock signal.

19. The method according to claim 16, wherein said manipulation elements comprise delay elements for applying a delay equal to one cycle of the first clock signal.

20. The method according to claim 16, wherein said manipulation elements comprise flip-flops.

21. The method according to claim 20, wherein said flip-flops are timed with the frequency of the first clock signal.

22. The method according to claim 16, wherein the logic network comprises logic gates controlled by at least one of a first signal indicating the ratio between the frequency of the first clock signal and the frequency of the second clock signal, and a second signal indicating a phase relation between the first clock frequency and the second clock frequency.

23. The method according to claim 16, wherein said logic network comprises at least one multiplexor for controlling a respective manipulation element of the converter circuit.

* * * * *